US012294142B2

(12) United States Patent
Märtl et al.

(10) Patent No.: US 12,294,142 B2
(45) Date of Patent: May 6, 2025

(54) ANTENNA ARRANGEMENT FOR MOBILE RADIO SYSTEMS, A STACKED ANTENNA SYSTEM AND A MOBILE RADIO ANTENNA COMPRISING THE ANTENNA ARRANGEMENT AND THE STACKED ANTENNA SYSTEM

(71) Applicant: Telefonaktiebolaget LM Ericsson (publ), Stockholm (SE)

(72) Inventors: Alfred Märtl, Riedering (DE); Magnus Hubner, Hohenlinden (DE); Benjamin Eberl, Waldmünchen (DE); Benjamin Hart, Rosenheim (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 238 days.

(21) Appl. No.: 17/919,788

(22) PCT Filed: Apr. 22, 2020

(86) PCT No.: PCT/EP2020/061250

§ 371 (c)(1),
(2) Date: Oct. 19, 2022

(87) PCT Pub. No.: WO2021/213653

PCT Pub. Date: Oct. 28, 2021

(65) Prior Publication Data

US 2023/0198132 A1 Jun. 22, 2023

(51) Int. Cl.
*H01Q 1/24* (2006.01)
*H01Q 5/307* (2015.01)
(Continued)

(52) U.S. Cl.
CPC ............ *H01Q 1/246* (2013.01); *H01Q 5/307* (2015.01); *H01Q 5/42* (2015.01); *H01Q 19/108* (2013.01); *H01Q 21/26* (2013.01)

(58) Field of Classification Search
CPC ........ H01Q 1/246; H01Q 5/42; H01Q 19/108; H01Q 21/26
See application file for complete search history.

(56) References Cited

U.S. PATENT DOCUMENTS 9,184,488 B2 * 11/2015 Portier ................ H01Q 1/1207
2004/0201537 A1 * 10/2004 Stolle .................... H01Q 19/10 343/797

(Continued)

FOREIGN PATENT DOCUMENTS

DE 10316564 A1 11/2004
JP 2012510229 A 4/2012
JP 2012519990 A 8/2012

OTHER PUBLICATIONS

International Search Report and Written Opinion for International Patent Application No. PCT/EP2020/061250, mailed Jan. 12, 2021, 9 pages.

(Continued)

*Primary Examiner* — Dameon E Levi
*Assistant Examiner* — Leah Rosenberg
(74) *Attorney, Agent, or Firm* — Withrow & Terranova, PLLC

(57) ABSTRACT

An antenna arrangement comprises an antenna which has an antenna body and a radiator arrangement. An antenna holder comprises a base portion. An upper side of the antenna holder points to-wards an underside of the antenna body and an underside of the antenna holder points towards an electrically conductive base plate. Only a supporting part of the underside of the antenna body rests on the base portion, so that a receiving space is formed be-tween another part of the underside of the antenna body and the base portion. The base portion of the antenna holder is electrically non-conductive, whereby the another part of the underside of the antenna (Continued)

body is capacitively coupled to the base plate via the receiving space.

16 Claims, 8 Drawing Sheets

(51) Int. Cl.
*H01Q 5/42* (2015.01)
*H01Q 19/10* (2006.01)
*H01Q 21/26* (2006.01)

(56) References Cited

U.S. PATENT DOCUMENTS

2006/0114168 A1 6/2006 Gottl et al.
2008/0036674 A1* 2/2008 Riedel .................. H01Q 21/062 343/818
2012/0038540 A1* 2/2012 Jacob ..................... H01Q 1/246 343/878
2012/0127054 A1 5/2012 Portier et al.
2016/0365641 A1* 12/2016 Mayer ...................... H01Q 1/50
2019/0312362 A1 10/2019 Quitt

OTHER PUBLICATIONS

International Preliminary Report on Patentability for International Patent Application No. PCT/EP2020/061250, mailed Jun. 30, 2022, 8 pages.
Notice of Reasons for Refusal for Japanese Patent Application No. 2022-563915, mailed Feb. 20, 2024, 59 pages.
Notice of Reasons for Refusal for Japanese Patent Application No. 2022-563915, mailed Aug. 6, 2024, 4 pages.
Decision to Grant for Japanese Patent Application No. 2022-563915, mailed Oct. 29, 2024, 5 pages.

* cited by examiner

ANTENNA ARRANGEMENT FOR MOBILE RADIO SYSTEMS, A STACKED ANTENNA SYSTEM AND A MOBILE RADIO ANTENNA COMPRISING THE ANTENNA ARRANGEMENT AND THE STACKED ANTENNA SYSTEM

TECHNICAL FIELD

The invention relates to an antenna arrangement for mobile radio systems, a stacked antenna system and a mobile radio antenna comprising the antenna arrangement and the stacked antenna system.

BACKGROUND

An antenna arrangement is shown in DE 103 16 564 A1. The antenna arrangement comprises an antenna having a radiator and an antenna body. The antenna body is mounted on a pedestal arrangement which is electrically nonconductive. The pedestal arrangement is in turn mounted on a reflector. As such, the antenna is capacitively coupled to the reflector. This allows for electrical characteristic values being clearly reproducible, because no electrical contact between two metal surfaces is needed which is hard to be reproduced and which might change over time.

SUMMARY

An object of the present invention is seen in simplifying a manufacturing process of an antenna arrangement for mobile radio systems that can be used in an antenna array.

The object is solved by an antenna arrangement for mobile radio systems according to claim 1 and by a stacked antenna system according to claim 14 and by a mobile radio antenna according to claim 16. Claims 2 to 13 describe further embodiments of the antenna arrangement. Claim 15 describes another embodiment of the stacked antenna system.

The antenna arrangement for mobile radio systems according to the present invention comprises an antenna and an antenna holder. The antenna comprises an antenna body and a radiator arrangement. The radiator arrangement is arranged at an upper side of the antenna body. Preferably the radiator arrangement and the antenna body are made of one piece. Further preferably the antenna body as well as the radiator arrangement comprise or consist of electrically conductive material like aluminium for example. Further preferably, the antenna could be made in a casting process. The antenna holder comprises a base portion having an underside and an upper side. The underside of the base portion points towards an electrically conductive base plate which could be a reflector for example. The upper side of the base portion points towards an underside of the antenna body. The underside of the antenna body comprises a supporting part. The antenna body only rests with that supporting part on the base portion of the antenna holder so that a receiving space is formed between another part of the underside of the antenna body and the base portion. At least the bottom portion of the antenna holder is electrically non-conductive. Preferably the whole antenna holder is electrically non-conductive and more preferably the whole antenna holder is made of plastic material. Therefore, the another part of the underside of the antenna body is capacitively coupled to the base plate via the receiving space. It is very beneficial that by using such a receiving space the capacitive coupling can be adjusted. Depending on how far the another part of the underside of the antenna body is spaced apart from the electrically conductive base plate the capacitive coupling can be changed. The same is true of the receiving space is filled with other materials. Therefore, the same antenna arrangement can be used for different application.

In a further embodiment, the underside of the antenna body has an area protruding towards the base portion of the antenna holder. This protruding area thereby forms the supporting part which rests on the base portion of the antenna holder. Alternatively, the base portion could comprise an area protruding towards the underside of the antenna body. As a result, only the supporting part of the antenna body rests on this protruding area of the base portion.

In order to increase the capacitive coupling a further embodiment of the present invention suggests that more than 60%, 70%, 80% or more than 90% of the base plate is free of openings in the area below the receiving space. Alternatively, the base plate could also be completely free of openings in the area below the receiving space.

In another preferred embodiment of the invention an inlay is used and placed in the receiving space. The inlay consists of or comprises a dielectric material. The use of such an inlay is very beneficial, because the inlay can be chosen in such a way that it matches the requirements of the antenna arrangement. Having a plurality of antenna arrangements aligned along an axis to form an antenna array, the coupling of the individual antenna arrangements to the reflector is preferably not the same for all antenna arrangements. It changes depending on the position of the antenna arrangement in the antenna array. By replacing an inlay with another inlay having a different dielectric material the whole antenna arrangement can basically stay the same. As such, only one antenna and one antenna holder is used. This allows that the production process can be kept simple.

In another embodiment of the invention, the inlay has an asymmetrical shape. As a result, the inlay can only be inserted into the receiving space at a predetermined angular position. This reduces the chances that any mistakes are being made during manufacture. In addition or alternatively, the shape of the inlay corresponds to the shape of the receiving space. This ensures that the inlay stays in position during all time. As such, the electrical characteristics of the antenna arrangement will not change over time.

To further support the correct alignment of the inlay, another embodiment of the invention suggests that the receiving space is enclosed by an edge area. This edge area protrudes from the bottom portion towards the antenna body. The height of this edge area is preferably less than 10 mm, 8 mm, 6 mm, 4 mm, 2 mm or less than 1 mm but preferably higher than 0.5 mm, 1 mm or higher than 2 mm.

In another preferred embodiment of the present invention the colour of the inlay corresponds to the dielectric constant of the inlay. As such, mistakes during the production process are drastically reduced, because technicians can immediately see whether the right inlay is inserted into the receiving space.

In other preferred embodiment, the antenna holder comprises a holding section. The holding section extends from the base portion of the antenna holder along the antenna body. The holding section and the base portion are preferably formed in one piece. The holding section of the antenna holder ends below the upper end of the antenna body. The holding section further comprises fastening means. These fastening means are in contact with the antenna body thereby holding the antenna body in place within said antenna holder. Preferably, the antenna body of the antenna comprises at least two balancing slots arranged on different sides of the antenna body. The at least two balancing slots extend from the upper end of the antenna body towards the lower end of the antenna body. Those slots than end at a distance from the lower end of the antenna body. The fastening means of the holding section of the antenna holder engage in the respective balancing slot. The antenna body is preferably hollow.

In a preferred embodiment, the holding section of the antenna holder comprises an opening in the area of the base portion. As a result, the receiving space can be seen from outside the antenna holder. This allows that the inlay is also visible from the outside of the antenna holder. Therefore, it can easily be verified whether an inlay has been inserted into the receiving space and if applicable depending on the colour of the inlay whether the right inlay (correct dielectric constant) is placed within the receiving space.

In another preferred embodiment at least one electrically conductive (partial) circumferential frame is provided. This circumferential frame is arranged between a radiator plane of the radiator arrangement and the lower end of the antenna body. The at least one electrically conductive partial circumferential frame has openings through which the antenna body extends. The circumferential frame is aligned parallel to the radiator plane. Preferably, the electrically conductive partial circumferential frame is free of any galvanic connection to the antenna body or radiator arrangement. More preferably, the circumferential frame is not electrically connected to any other element. Even more preferably, the circumferential frame has a section comprising an opening thereby forming a first end portion and a second end portion. Both end portions are facing each other. This circumferential frame allows that the bandwidth is increased.

The stacked antenna system according to the present invention comprises the antenna arrangement as previously discussed. The stacked antenna system also comprises a further antenna arrangement. The antenna arrangement as previously discussed is operable in a first frequency range, wherein the further antenna arrangement is operable in a second frequency range. The second frequency range is lower than the first frequency range. The stacked antenna system also comprises a reflector. The further antenna arrangement is arranged on the reflector. The further antenna arrangement also comprises a radiator structure with at least four radiator elements extending away from the reflector in a funnel-shaped manner A socket arrangement is arranged within the further antenna arrangement thereby forming a support surface. The antenna arrangement is arranged on that support surface. This allows a compact construction of the stacked antenna system. The first frequency range is preferably between 1428 MHz and 2690 MHz and the second frequency range is preferably between 698 MHz and 960 MHz.

In a preferred embodiment, the electrically conductive base plate of the antenna arrangement is formed by the support surface of the socket arrangement. Alternatively, the electrically conductive base plate of the antenna arrangement is arranged on top of the support surface and galvanically or capacitively coupled to the support surface of the socket arrangement.

The mobile radio antenna according to one aspect of the invention comprises a plurality of antenna arrangements and a plurality of stacked antenna systems. The plurality of antenna arrangements and the plurality of stacked antenna systems are arranged alternatively along a longitudinal axis of the mobile radio antenna on a first side of a reflector. At least one phase shifting device is provided an arranged on a second side of the reflector. It could be possible that more components, especially active components like amplifiers (for example lower noise amplifier to amplify received mobile communication signals) are also arranged on the second side of the reflector. A radome arrangement is provided and closes the mobile radio antenna with the plurality of antenna arrangements and the plurality of stacked antenna systems as well as the phase-shifting device which are preferably all mounted on the reflector.

BRIEF DESCRIPTION OF THE DRAWINGS

Different embodiments of the invention will be described in the following, by way of example and with reference to the drawings. The same elements are provided with the same reference signs. The figures show in detail.

DETAILED DESCRIPTION

Figure 1:
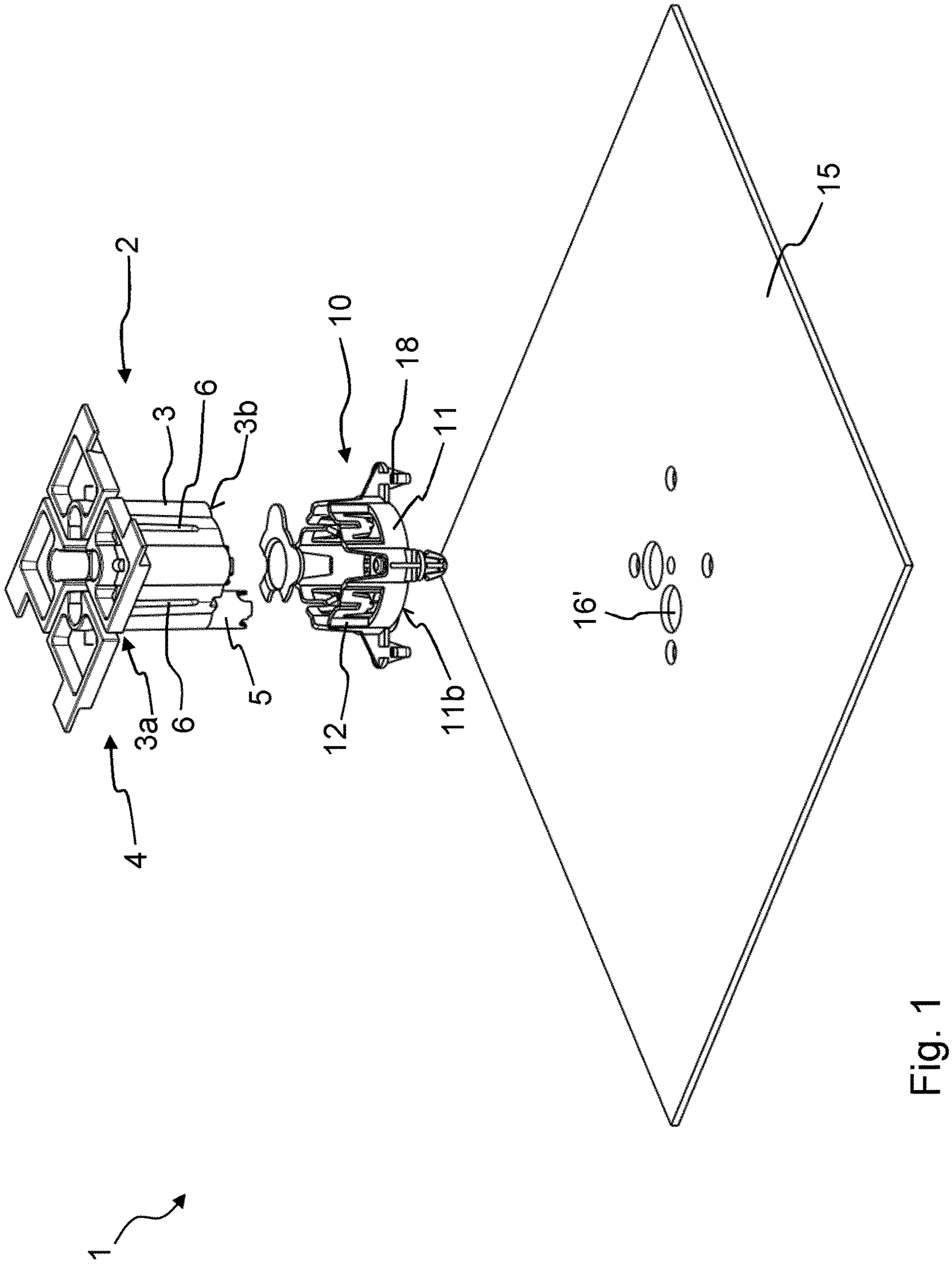
FIG. 1: a three-dimensional view of an antenna arrangement according to the present invention.

In the following, reference is made to FIGS. 1, 2A, 2B, 3A, 3B and 3C describing a first embodiment of an antenna arrangement 1 according to the present invention. The antenna arrangement 1 is used for mobile radio systems and is especially used within a mobile radio antenna mounted on a tower. The antenna arrangement 1 comprises an antenna 2 having an antenna body 3 and a radiator arrangement 4. The radiator arrangement 4 is located at an upper side 3*a* of the antenna body 3. The radiator arrangement 4 and the antenna body 3 are preferably made of a single piece. The antenna 2 is preferably in form of a dipole. More preferably, the antenna 2 is in form of a vector dipole, cross dipole or quad dipole. Within FIG. 1, the feeding network (feeding cables) is not shown.

Furthermore, an antenna holder 10 is shown, wherein the antenna holder 10 comprises a base portion 11. An upper side 11*a* of the base portion 11 is directed towards an underside 3*b* of the antenna body 3. An underside 11*b* of the base portion 11 is directed towards an electrically conductive base plate 15.

The base plate 15 has openings for fastening the antenna holder 10. Preferably no screw connection, rivet connection or solder connection is used to fasten the antenna holder 10 to the base plate 15. More preferably, fastening means 18 in form of snap-in connections are used to fasten the antenna holder 10 to base plate 15.

The antenna holder 10 is preferably made of non-conductive material like plastic.

The antenna body 3 preferably comprises a feeding extension 5 which is basically a hollow cylinder extending from one part of the underside 3*b* of the antenna body 3 reaching through an opening 16 in the antenna holder 10 and through an opening 16' of the base plate 15. Preferably there are two feeding extensions 5 (for two polarizations). The respective feeding cables are fed through those feeding extensions 5 and through the antenna body 3 up to the radiator arrangement 4. The feeding cables might be soldered to the respective parts of the radiator arrangement 4. However, also a capacitive coupling could be used. Preferably a strain relief is used for the feeding cables in the underside of the reflector.

Figures 2A, 2B:
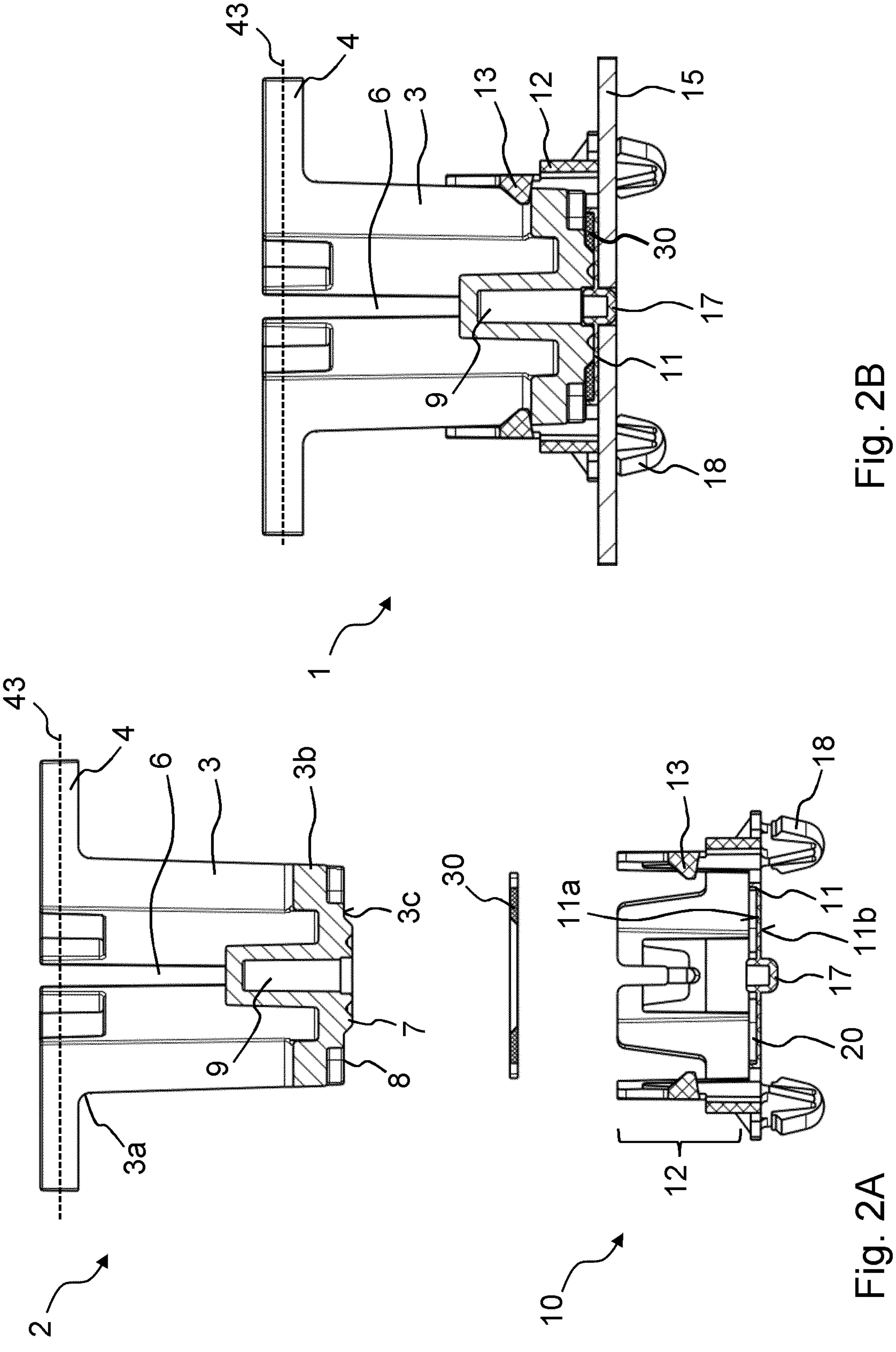
FIGS. 2A, 2B: longitudinal section views through the antenna arrangement of FIG. 1, FIG. 3A: a top view of an antenna holder of the antenna arrangement of FIG. 1, FIG. 3B: a three-dimensional view of an inlay.

In FIGS. 2A, 2B it is shown that the antenna holder 10 comprises a holding section 12 extending from the base portion 11. The holding section 12 runs along the longitudinal axis of the antenna 1. The holding section 12 is preferably partly circumferential and encloses at least a part of the antenna body 3. More preferably, the holding section 12 ends below the upper end 3*a* of the antenna body 3. The holding section 12 comprises fastening means 13, wherein said fastening means 13 can be brought into contact with said antenna body 3. As a result, said antenna body 3 is placed in position within said antenna holder 12.

Those fastening means 13 are preferably in form of a snap-in connection engaging an opening with the antenna body 3. Preferably the antenna body 3 of the antenna 1 comprises at least two balancing slots 6 each of them arranged on a different side of the antenna body 3. Preferably there is one balancing slot 6 for each of the four sides of the antenna body 4 (four balancing slots 6 in total). The balancing slots 6 extend from the upper end 3*a* of the antenna body 3 towards to lower end 3*b* of the antenna body 3. The fastening means 13 of the holding section 12 of the antenna holder 10 engage the respective balancing slot 6.

The holding section 12 could be completely closed along its peripheral area. Preferably, as shown in the above mentioned figures, the holding section 12 comprises some openings.

After the antenna 2 is placed in the antenna holder 10 only a supporting part 7 of the underside 3*c* of the antenna body 3 rests on the base portion 11. As such, a receiving space 20 is formed between another part 8 of the underside 3*c* of the antenna body 3 and the base portion 11. Through the receiving space 20 a capacitive coupling is established between the antenna body 3 and therefore between the antenna 2 and the electrically conductive base plate 15.

The antenna 2 is preferably only coupled to the base plate 15 by using a capacitive coupling. The antenna 2 is preferably not coupled to the base plate 15 by using a galvanic connection.

As shown in FIGS. 2A and 2B, the underside 3*c* of the antenna body 3 has an area 7 protruding towards the base portion 11 of the antenna holder 10. This area 7 forms the supporting part 7 which then rests on the base portion 11.

Of course, it could also be the case that the base portion 11 comprises an area 14 (see FIG. 3A) protruding towards the underside 3*c* of the antenna body 3, wherein only the supporting part 7 of the antenna body 3 rests on this protruding area 14 of the base portion 11.

In order to increase the capacitive coupling between the another part 8 of the underside 3*c* of the antenna body 3 and the base plate 15, more than 60%, 70%, 80% or more than 90% of the base plate 15 is free of openings in the area below the receiving space 20. Alternatively, it would also be possible that the base plate 15 is completely free of openings in the area below the receiving space 20.

In order to increase the capacitive coupling between the antenna 2 and the base plate 15, an inlay 30 is arranged in the receiving space 20. The inlay 30 comprises a dielectric material. The dielectric constant is preferably between 2 and 10. The dielectric constant is preferably higher than 2, 3, 4, 5, 6, 7, 8 and preferably higher than 9, but preferably lower than 11, 10, 9, 8, 7, 6, 5, 4 and preferably lower than 3 The inlay 30 is preferably made of one piece.

Preferably, the inlay 30 has a thickness of less than 10 mm, 9 mm, 8 mm, 7 mm, 6 mm, 5 mm, 4 mm, 3 mm, 2 mm, 1 mm or less than 0.5 mm. However, the thickness of the inlay 30 is preferably higher than 0.2 mm, 0.5 mm, 1 mm, 2 mm, 3 mm, 4 mm, 5 mm, 6 mm, 7 mm, 8 mm or higher than 9 mm More preferably, the inlay has a thickness of 0.8 mm.

The inlay 30 is inserted into the receiving space 20 before the antenna 2 is inserted into the antenna holder 10.

Preferably, more than 40%, 50%, 60%, 70%, 80% or more than 90% of the receiving space 20 is filled with the inlay 30. More preferably, the receiving space 20 is completely filled with the inlay 30.

The inlay 30 as shown is free of any openings. However, the inlay 30 could also comprise one or more openings. The one or more openings could further preferably engage with one or more counterpart elements like a rod or a protrusion extending from the base portion 11 of the antenna holder 10. As such, the inlay 30 is then fixed to the base portion 11 of the antenna holder 10.

The inlay 30 could also be made a dielectric material suitable for soldering. The inlay 30 is not a foil, because placing a foil onto the base portion 11 of the antenna holder 10 would be hard to reproduce.

FIG. 2B shows that the inlay 30 preferably comes in contact with the another part 8 of the underside 3*c* of the antenna body 3 as well with the upper side 11*a* of the base portion 11 of the antenna holder 10.

The holding section 12 of the antenna holder 10 preferably comprises an opening in the area of the base portion 11, so that the inlay 30 is visible from outside the antenna holder 10. It is also possible that a part of the inlay 30 is arranged within the opening or that a part of the inlay 30 even extends through the opening.

The colour of the inlay 30 preferably corresponds to the dielectric constant of the inlay 30.

Figure 3A:
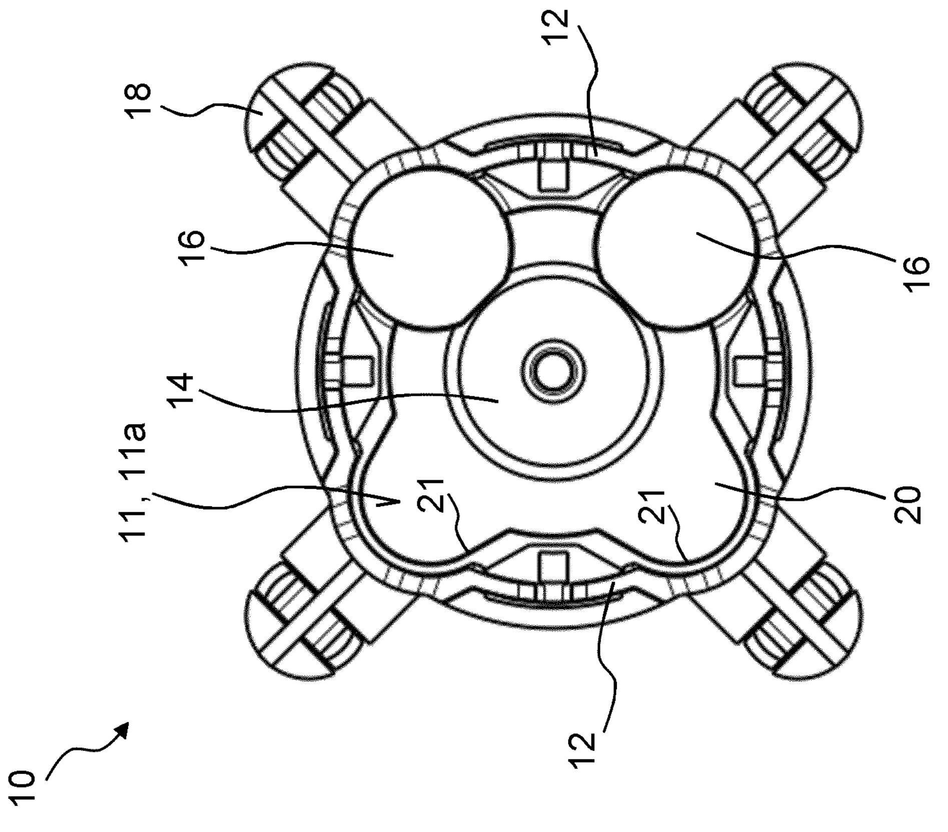
FIG. 3C: a visualization of the sizes of a base portion of an antenna holder and the inlay.

Referring now to FIG. 3A it can be seen that the receiving space 20 is enclosed by an edge area 21, wherein the edge area 21 protrudes from the bottom portion 11 towards the antenna 2. The edge area 21 can be the holding section 12. Preferably this is not the case, so that the edge area 21 is arranged besides the holding section 12. It could also be that a part of the edge area 21 is also the holding section 11 and that another part of the edge area 21 is spaced apart from the holding section 11. The antenna holder 10 and the edge area a preferably made in one piece.

Within FIG. 3A, the base portion 11 comprises the area 14 protruding towards the underside 3*c* of the antenna body 3. This area 14 is basically located in the middle of the base portion 11. This area 14 has preferably a cross section that is circumferential or at least partly circumferential. The receiving space is 20 located between that area 14 and the edge area 21 or the holding section 12. This means that the receiving space 20 extends outwardly from the area 14 protruding towards the underside 3*c* of the antenna body 3.

The receiving space 20 is of an asymmetrical shape, which in turn means that the inlay 30 is also of an asymmetrical shape. As such, the inlay 30 can only be inserted into the receiving space 20 at a predetermined angular position. More preferably, the shape of the inlay 30 (fully) corresponds to the shape of the receiving space 20. The receiving space 20 could also be of a symmetrical shape and the inlay 30 could in turn be for example disc-like having a circular cross-section.

The base portion 11 also has openings 16. Such openings 16' can also be found in the base plate 15. The openings 16, 16' are arranged above each other. The feeding extension 5 (if used) of the antenna body 3 extends through these openings 16, 16'.

It can also be seen that the receiving space 20 has rounded edge portions.

Figure 3B:
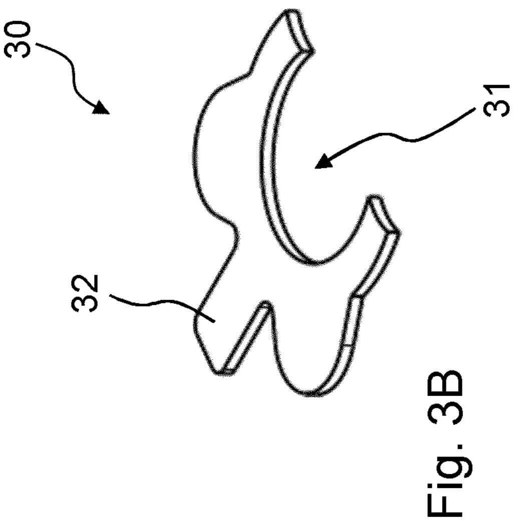

The same is preferably also true for the inlay 30 as shown in FIG. 3B. The inlay 30 has also rounded edge portions corresponding to the rounded edge portions of the receiving space 20. The inlay 30 preferably comprises a recess 31 which corresponds to the shape of the protruding area 14 of the base portion 10. It could also correspond to the protruding area 7 of the underside 3*c* of the antenna body 3. Preferably, the inlay 30 also comprises a connecting web 32. In that case, the inlay 30 is further preferably formed in one piece with the antenna holder 10, especially with the holding section 12 or with the protruding area 14 of the base portion 10. The connecting web 32 is severable so that the inlay 30 can be removed if needed thereby changing the capacitive coupling between the antenna 2 and the base plate 15.

Figure 3C:
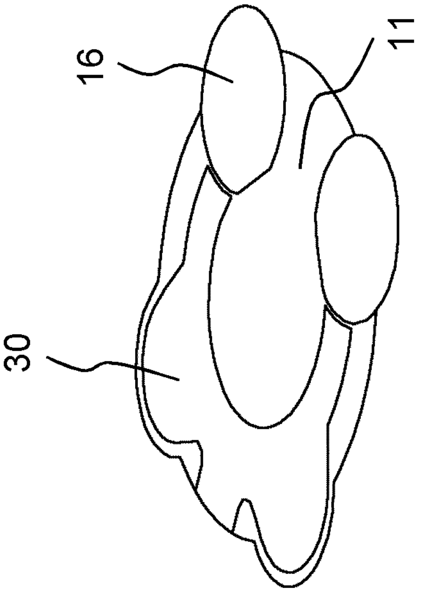

FIG. 3C visualizes the sizes of the base portion 11 of the antenna holder 10, the opening 16 in the antenna holder 10 and the inlay 30. The inlay 30 preferably covers more than 20%, 25%, 30%, 35% or more than 40% of the area of the base portion 11 of the antenna holder 10. The inlay 30 preferably covers less than 70%, 65%, 60%, 55% or less than 50% of the area of the base portion 11 of the antenna holder 10. In the embodiment shown in FIG. 3C, the inlay 30 covers approximately 32% of the area of the base portion 11 of the antenna holder 10 if the area of the openings 16 is also part of the area of the base portion 11 of the antenna holder 10. The area of both openings 16 preferably covers approximately 25% of the total area of the base portion 11 of the antenna holder 10. The whole area (outer border) of the base portion 11 of the antenna holder 10 is preferably larger than 500 $mm^2$, 550 $mm^2$, 600 $mm^2$ or larger than 650 $mm^2$ The area (outer border) of the base portion 11 of the antenna holder 10 is further preferably smaller than 750 $mm^2$, 700 $mm^2$, 650 $mm^2$, 600 $mm^2$ or smaller than 550 $mm^2$ The size of the cross-section of the inlay 30 is preferably larger than 100 $mm^2$, 150 $mm^2$, 200 $mm^2$ or larger than 250 $mm^2$ The size of the cross-section of the inlay 30 is preferably smaller than 300 $mm^2$, 250 $mm^2$, 200 $mm^2$ or smaller than 150 $mm^2$.

Referring again to FIG. 2B, it is also shown that the base portion 11 has a pedestal arrangement 17 which is preferably in the center of the base portion 11. This pedestal arrangement 17 engages in a recess 9 in the middle of the underside 3*c* of the antenna body 3.

The fastening means 18 of the antenna holder 10 are also shown which are used to fasten the antenna holder 10 to the base plate 15 (preferably by using a snap-in connection).

Figure 4B:
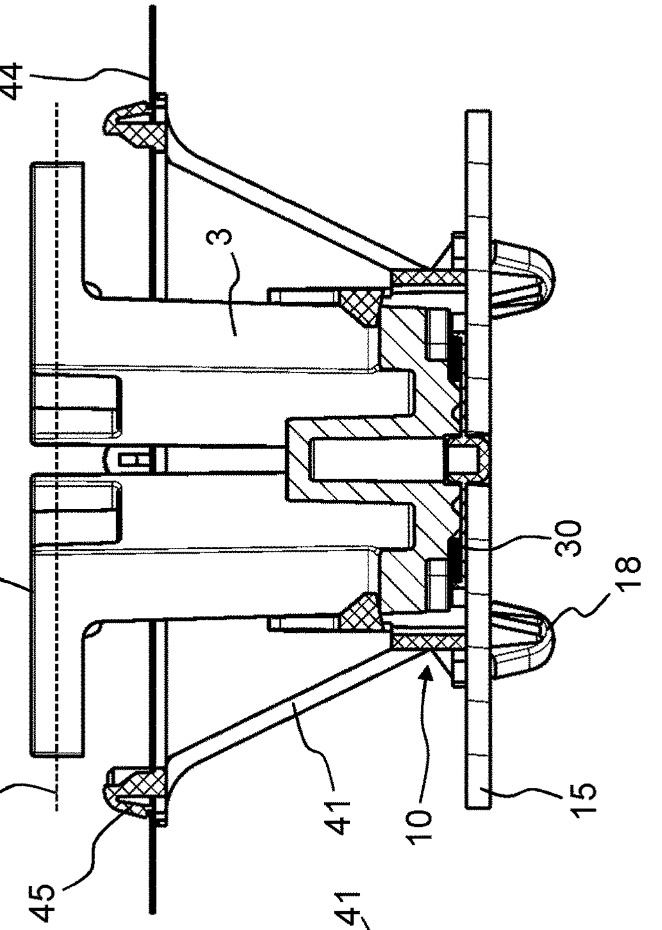
FIG. 4B: a longitudinal section view through the antenna arrangement of FIG. 4A.
Figure 4A:
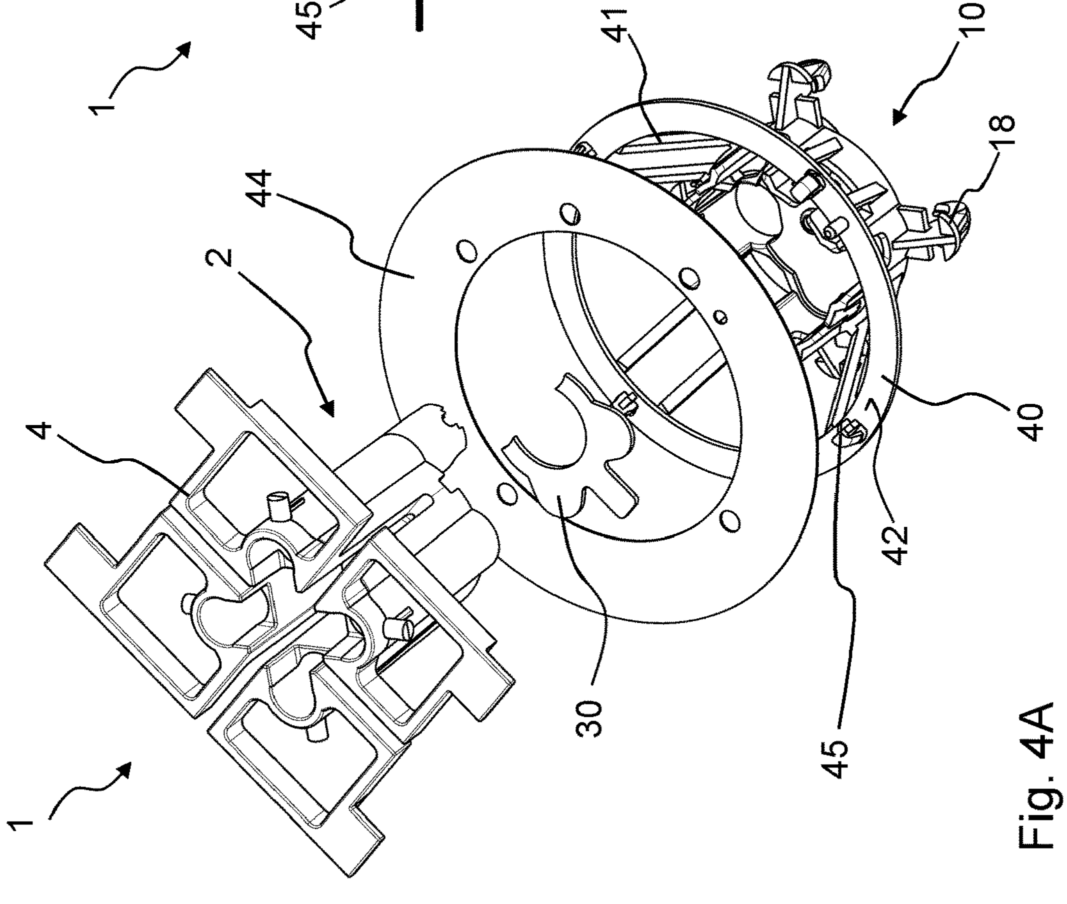
FIG. 4A: a three-dimensional view of another embodiment of the antenna arrangement according to the present invention.
Figure 4C:
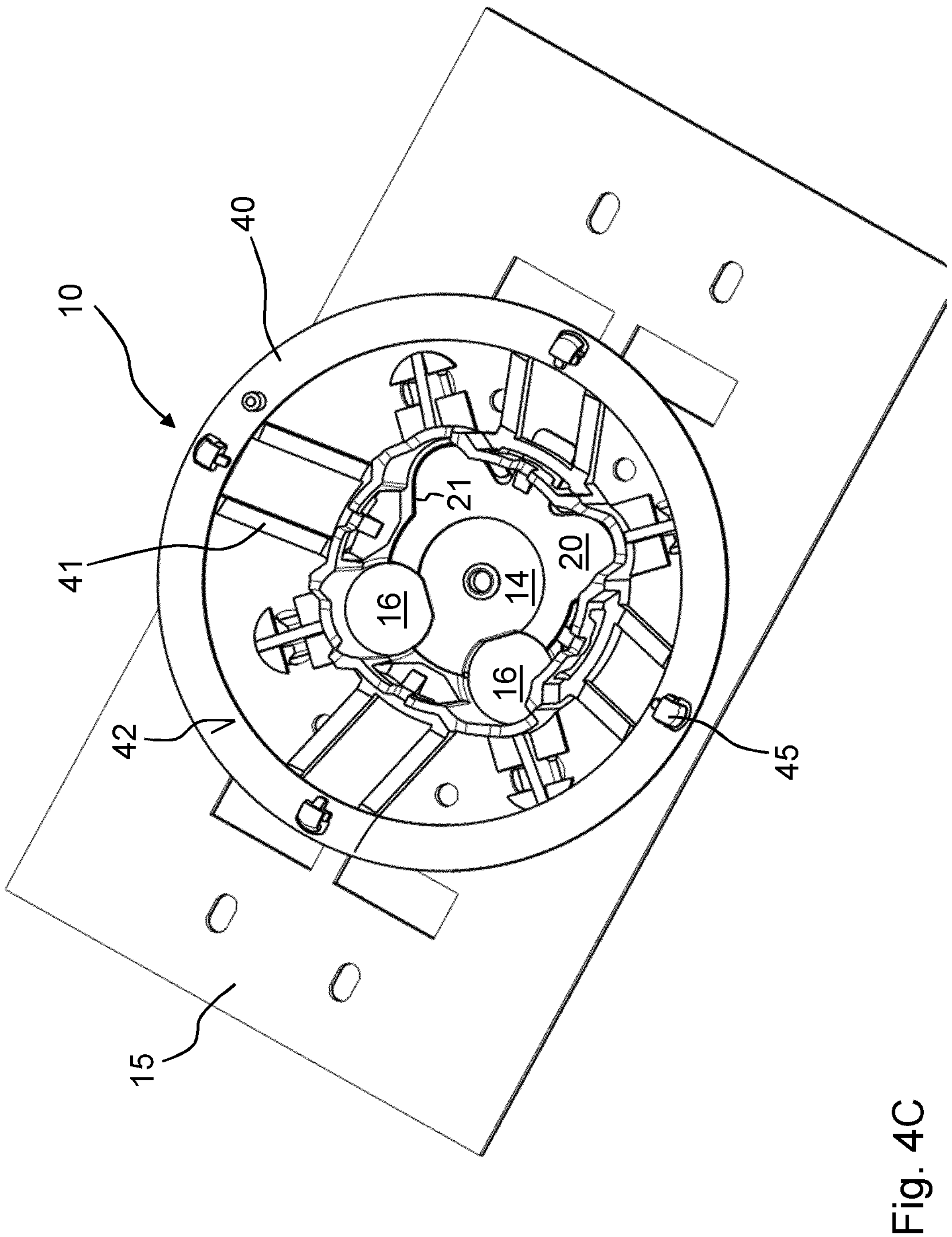
FIG. 4C: a top view of an antenna holder of the antenna arrangement of FIG. 4A.

FIGS. 4A, 4B and 4C show another embodiment of the antenna arrangement 1 according to the present invention. In addition to the antenna arrangement 1 as previously described, another holding structure 40 is described. The holding structure 40 is part of the antenna holder 10. Preferably the holding structure 40 and the antenna holder 10 are made of a single piece. The holding structure 40 comprises connecting arms 41 and a holding surface 42. The connecting arms 41 are spaced apart and a first end of the connecting arms 41 is connected or attached to the antenna holder 10. Preferably the first end of the connecting arms 41 is attached or connected or formed to an area of the antenna holder 10 which is close to the base portion 11. The connecting arms 41 preferably extend outwards and therefore away from the antenna holder 10. The connecting arms 41 therefore extend away from the longitudinal axis of the antenna 2.

The connecting arms 41 are preferably connected to each other at theirs second ends using the holding structure 40. The holding structure 40 has preferably the form of a ring and is further preferably attached to all connecting arms 41. The holding structure 40 has surface 42 which can be used for holding at least one electrically conductive circumferential frame 44. The electrical conductive at least partial circumferential frame 44 is arranged between a radiator plane 43 of the radiator arrangement 4 and the lower end 3*b* of the antenna body 3. The least one electrically conductive circumferential frame 44 has an opening through which the antenna body 3 extends. The least one electrically conductive circumferential frame 44 is aligned in parallel with the radiator pane 43.

It could also be possible that two or three electrically conductive circumferential frames 44 are used which are spaced apart from each other in longitudinal direction of the antenna 2. If two or more electrically conductive circumferential frames 44 are used, those frames are not galvanically connected to each other. Preferably none of the frames 44 is galvanically connected to any other object.

The surface 42 of the holding structure 40 has also fastening means 45, preferably in the form of a snap-in connection, to securely fasten the electrically conductive partial circumferential frame 44.

FIG. 4C shows another embodiment of the antenna arrangement 1 without the antenna 2.

Preferably the antenna holder 10 can be mounted on the base plate 15 by only using a snap-in connection. No screws, rivets or solder joints need to be used. In addition, the antenna 2 is attached to the antenna holder 10 only be means of a snap-in connection. Further preferably no screw, rivet or solder joints are used.

More preferably, the electrically conductive circumferential frame 44 is also only connected to the holding structure 40 by means of a snap-in connection. In that case also no screw connection, rivet or solder joints are used.

Figure 5A:
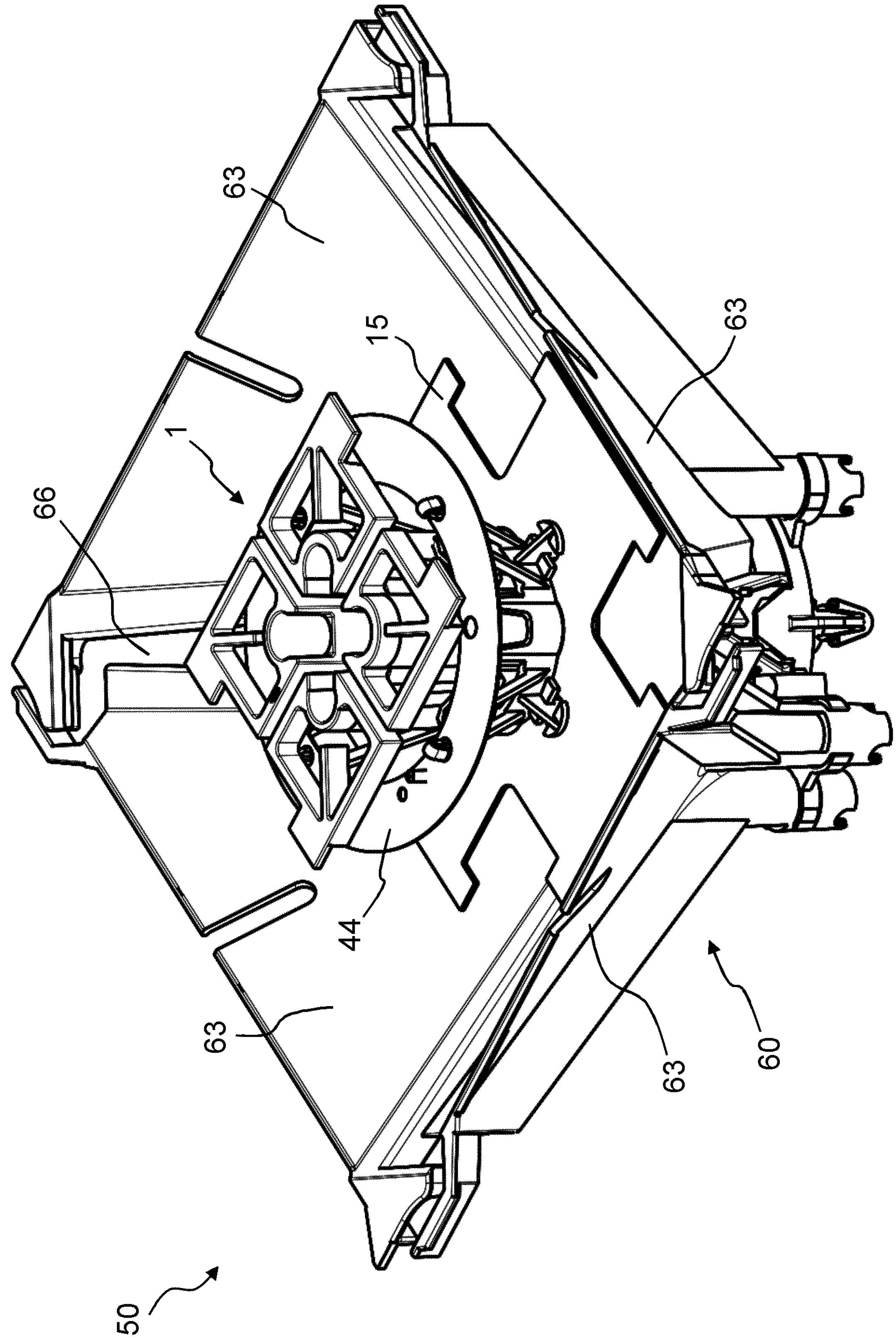
FIG. 5A: a three-dimensional view of a stacked antenna system according to the present invention.
Figure 5B:
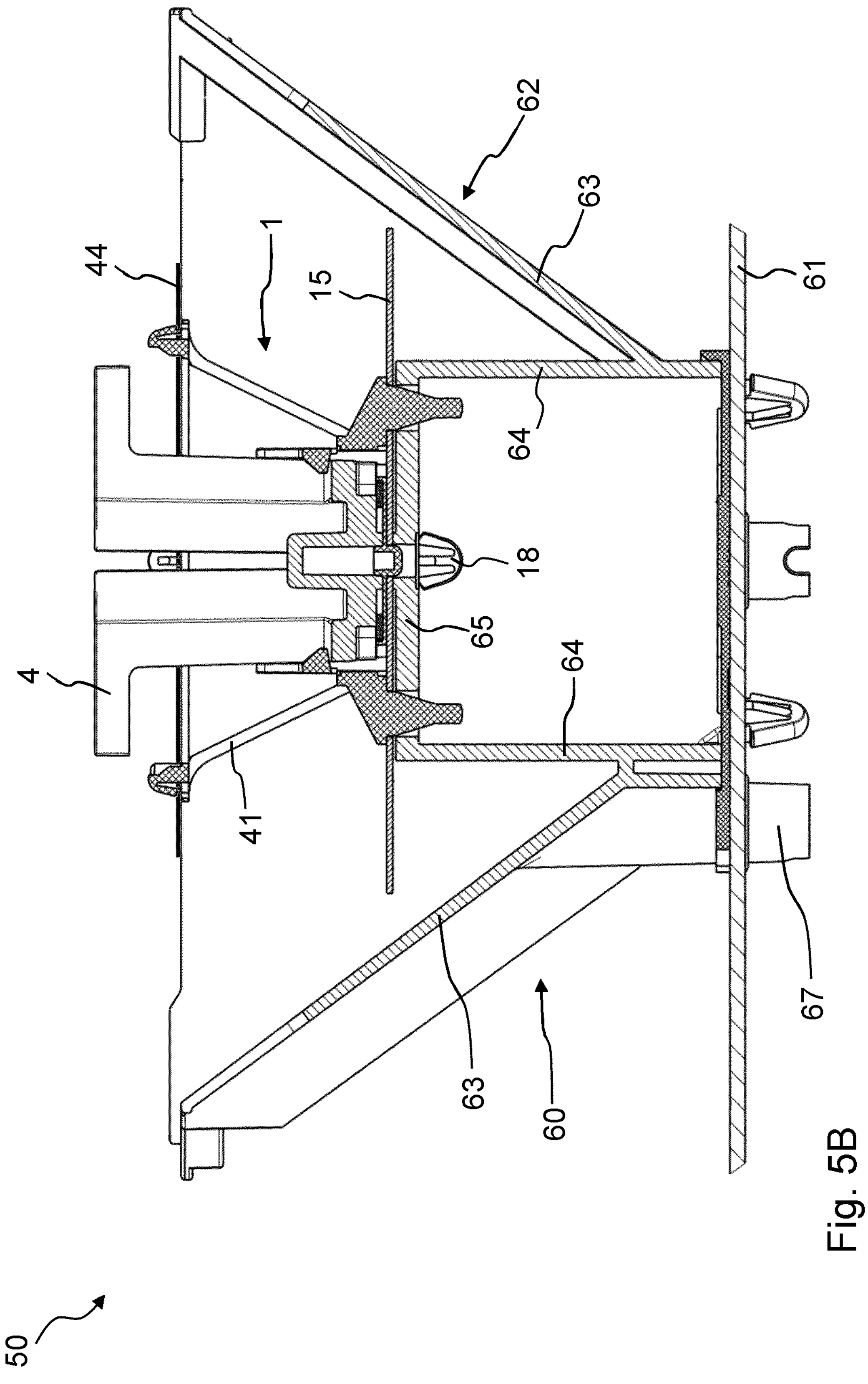
FIG. 5B: a longitudinal section view through the stacked antenna system of FIG. 5A.

FIGS. 5A and 5B show a stacked antenna system 50 according to the present invention. The stacked antenna system 50 comprises the antenna arrangement 1 as described previously. The antenna arrangement 1 is configured to operate in a first frequency range (i.e. 1428-2690 MHz) which can also be referred to as a "high frequency" range. In addition, a further antenna arrangement 60 is shown. The further antenna arrangement 60 is configured to operate in a second frequency range (i.e. 698-960 MHz). The second frequency range can also be referred to as "low frequency" range. That means that the first frequency range is located above the second frequency range. Preferably, both frequency ranges are non-overlapping.

Regarding FIG. 5B, it can be seen that a reflector 61 is provided within the stacked antenna system 50. The further antenna arrangement 60 is arranged on the reflector 61. This is preferably done by using a snap-in connection. The further antenna arrangement 60 is therefore preferably not soldered and/or screwed to the reflector 61. The further antenna arrangement 60 comprises a radiator structure 62 with at least four radiator elements 63. Those radiator elements 63 extend away from the reflector 61 in funnel-shaped manner. The at least four radiator elements 63 are preferably connected to each other at their base portion which in turn is arranged on the reflector 61. The at least four radiator elements 63 are galvanically coupled to the reflector or capacitively coupled thereto. The four radiator elements 63 are electrically conductive and are preferably made of one piece.

The further antenna arrangement 60 comprises a socket arrangement 64 which is preferably made of an electrically conductive material. More preferably, the socket arrangement 64 and the at least four radiator elements 63 are made of a single piece. The socket arrangement 64 is arranged within the area surrounded by the four radiator elements 63. The socket arrangement 64 comprises a support surface 65. The antenna arrangement 1 is then arranged on the support surface 65 of the socket arrangement 64. In FIG. 5B, it can be seen that the base plate 15 is arranged on top of the support surface 65. The base plate 15 can be galvanically or capacitively connected to the support surface 65. The antenna holder 10 is thereby not only fastened to the base plate 15, but also to the socket arrangement 64. This can be done by using a snap-in connection.

It could also be possible that the electrically conductive base plate 15 of the antenna arrangement 1 is formed by the support surface 65 of the socket arrangement 64.

The further antenna arrangement 60 can also comprise a feeding extension 67 which reached through the reflector 61.

As it can also be seen the radiator arrangement 4 of the antenna 2 is located above the radiator elements 63 of the further antenna arrangement 60. However, this does not have to be necessarily the case. It could also be that the radiator arrangement 4 of the antenna 2 comes to a flash end with the radiator elements 63 of the further antenna arrangement 60. It could also be that the radiator arrangement 4 of the antenna 2 ends within the area enclosed by the radiator elements 63 of the further antenna arrangement 60. Regarding the embodiment of FIG. 5B, the electrically conductive circumferential frame 44 is approximately in the same plane as the end of the radiator elements 63.

The base plate 15 can be of a rectangular or square form. However, it can also be in the form of a cross as shown in FIG. 5A. In addition, each of the end portions is preferably T-shaped. They could also be at least partly meander-shaped.

However, this does not have to be necessarily the case. The base plate 15 could also comprise a circumferential cross section.

Within FIG. 5A, the electrically conductive partial circumferential frame 44 is shown. However, the electrically conductive partial circumferential frame 44 is only optional.

A slot 66 between two neighboring radiator elements 63 could be at least partly meander-shaped. The slot 66 could also run along a straight line or lie in a plane.

Figure 6:
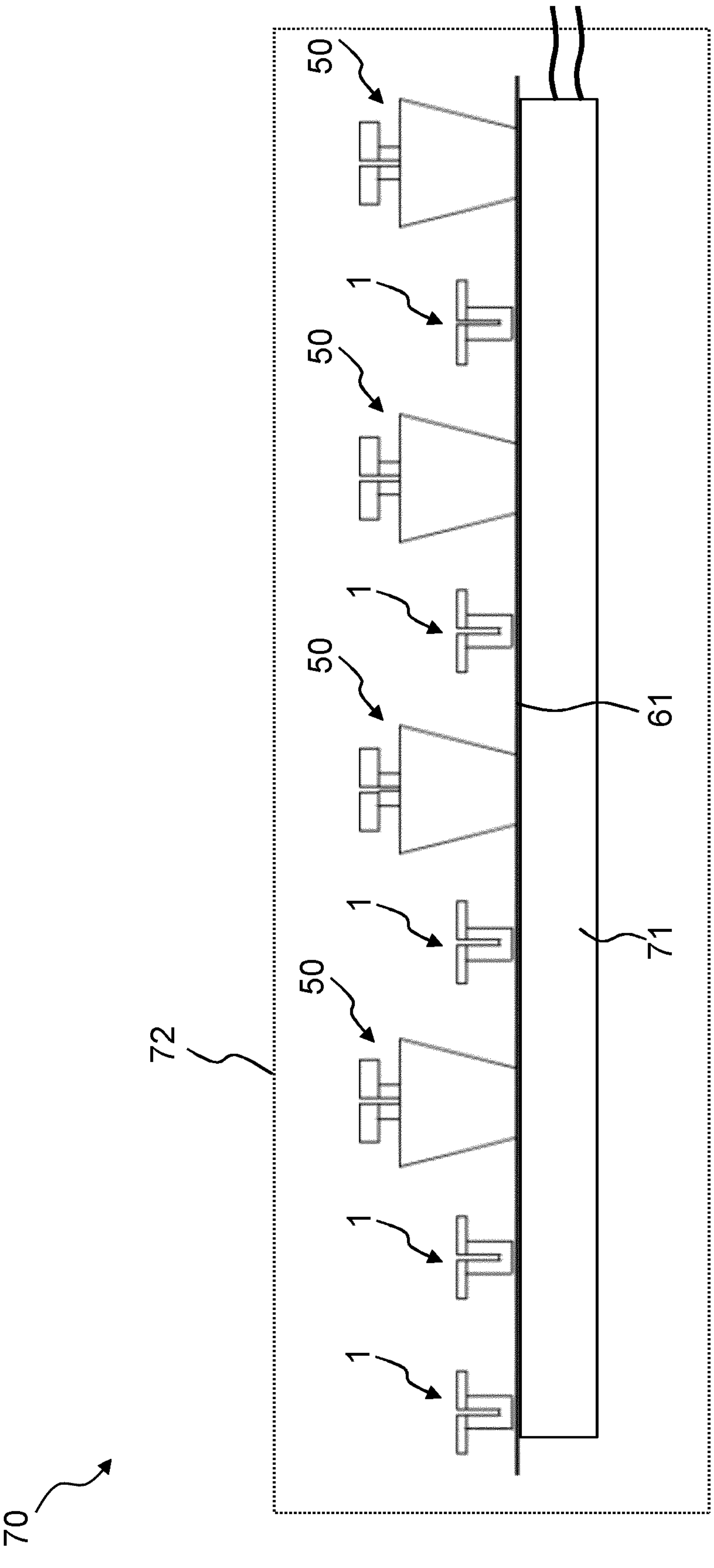
FIG. 6: a mobile radio antenna according to the present invention.

FIG. 6 describes a mobile radio antenna 70 according to the present invention. The mobile radio antenna 70 comprises a plurality of antenna arrangements 1 and a plurality of stacked antenna systems 50 as described previously. The plurality of antenna arrangements 1 and the plurality of stacked antenna systems 50 are arranged alternately along a longitudinal axis of the mobile radio antenna 70 on a first side of the reflector 61. On a second side of the reflector 61 a phase-shifting device 71 is arranged for example. A radome arrangement 72 encloses the whole mobile radio antenna 70.

The spacing between two antenna arrangements 1 preferably equals the wave length of the intermediate frequency of the first frequency range. The spacing between two stacked antenna systems 50 preferably equals the wave length of the intermediate frequency of the second frequency range.

The antenna arrangements 1 and/or the stacked antenna systems 50 which are arranged in the middle of the mobile radio antennas 70 are preferably free of an inlay 30.

The outermost antenna arrangements 1 comprise an antenna 2 which is galvanically coupled to base plate 15 which is in that case the reflector 61. Such a coupling could be achieved for example by soldering the feeding extension 5 to the base plate 15.

In addition or alternatively. the same is also true for the outermost stacked antenna systems 50. The antenna arrangements 1 and the further antenna arrangement 60 within the stacked antenna system 50 could in that case also be galvanically connected to the reflector 61.

The antenna arrangements 1 which are arranged between the outermost antenna arrangements 1 and the antenna arrangements 1 in the center preferably comprise an inlay 30. The same is also true for the stacked antenna systems 50 which are arranged between the outermost stacked antenna systems 50 and the stacked antenna system 50 arranged in the center.

The antenna 2 of the antenna arrangement 1 is configured to receive and/or transmit electromagnetic signals in one or two polarizations. Preferably, the antenna 2 transmits and/or receives in two linear, circular or elliptical polarisations. The same is also true for the further antenna arrangement 60.

The invention claimed is:

1. An antenna arrangement for mobile radio systems comprising:

an antenna comprising an antenna body and a radiator arrangement, the radiator arrangement being arranged at an upper side of the antenna body; and an antenna holder and a base plate that is electrically conductive, wherein the antenna holder comprises a base portion, wherein an upper side of the base portion points towards an underside of the antenna body and wherein an underside of the base portion points towards the base plate;

wherein:

only a supporting part of the underside of the antenna body rests on the base portion, so that a receiving space is formed between another part of the underside of the antenna body and the base portion; and at least the base portion of the antenna holder is electrically non-conductive, whereby the another part of the underside of the antenna body is capacitively coupled to the base plate via the receiving space.

2. The antenna arrangement according to claim 1, characterized by the following feature:

the underside of the antenna body has an area protruding towards the base portion of the antenna holder, thereby forming the supporting part which rests on the base portion; or the base portion comprises an area protruding towards the underside of the antenna body, wherein only the supporting part of the antenna body rests on this protruding area of the base portion.

3. The antenna arrangement according to claim 1, characterized by the following feature:

more than 40%, 50%, 60%, 70%, 80% or more than 90% of the base plate is free of openings in the area below the receiving space; or the base plate is completely free of openings in the area below the receiving space.

4. The antenna arrangement according to claim 2, characterized by the following feature:

an inlay is arranged in the receiving space, wherein the inlay consists of or comprises a dielectric material.

5. The antenna arrangement according to claim 4, characterized by the following features:

the inlay has an asymmetrical shape, so that the inlay can only be inserted into the receiving space at a predetermined angular position; and/or the shape of the inlay corresponds to the shape of the receiving space.

6. The antenna arrangement according to claim 4, characterized by the following feature:

the receiving space is further enclosed by an edge area, wherein the edge area protrudes from the base portion.

7. The antenna arrangement according to claim 4, characterized by the following feature:

the color of the inlay corresponds to the dielectric constant of the inlay.

8. The antenna arrangement according to claim 4, characterized by the following feature:

the inlay comprises a recess which corresponds to the shape of the protruding area of the underside of the antenna body or to the protruding area of the base portion.

9. The antenna arrangement according to claim 4, characterized by the following features:

the inlay is formed in one piece with the antenna holder via a connecting web;

the connecting web is severable so that the inlay can be removed.

10. The antenna arrangement according to claim 1, characterized by the following features:

the antenna holder comprises a holding section extending from the base portion of the antenna holder along the antenna body;

the holding section of the antenna holder ends below the upper end of the antenna body;

the holding section comprises fastening means, said fastening means being in contact with said antenna body to hold said antenna body in position within said antenna holder.

11. The antenna arrangement according to claim 10, characterized by the following features:

the antenna body of the antenna comprises at least two balancing slots arranged on different sides of the antenna body;

the at least two balancing slots extend from the upper end of the antenna body towards the lower end of the antenna body and end at a distance from the lower end of the antenna body;

the fastening means of the holding section of the antenna holder comprises a plurality of fastening means and each fastening mean engages in a respective balancing slot.

12. The antenna arrangement according to claim 10, characterized by the following feature:

the holding section of the antenna holder comprises an opening in an area of the base portion and an inlay visible from outside the antenna holder.

13. The antenna arrangement according to claim 1, characterized by the following features:

at least one electrically conductive partial circumferential frame is provided, which is arranged between a radiator plane of the radiator arrangement and the lower end of the antenna body, wherein the at least one electrically conductive partial circumferential frame has an opening through which the antenna body extends;

the at least one electrically conductive partial circumferential frame is aligned parallel to the radiator plane.

14. A stacked antenna system comprising:

an antenna arrangement comprising:

an antenna comprising an antenna body and a radiator arrangement, the radiator arrangement being arranged at an upper side of the antenna body; and an antenna holder and a base plate that is electrically conductive, wherein the antenna holder comprises a base portion, wherein an upper side of the base portion points towards an underside of the antenna body and wherein an underside of the base portion points towards the base plate;

wherein:

only a supporting part of the underside of the antenna body rests on the base portion, so that a receiving space is formed between another part of the underside of the antenna body and the base portion;

at least the base portion of the antenna holder is electrically non-conductive, whereby the another part of the underside of the antenna body is capacitively coupled to the base plate via the receiving space; and the antenna arrangement is configured to operate in a first frequency range; and a further antenna arrangement, the further antenna arrangement configured to operate in a second frequency range which lies below the first frequency range;

wherein:

a reflector is provided;

the further antenna arrangement is arranged on the reflector and comprises a radiator structure with at least four radiator elements extending away from the reflector in a funnel-shaped manner;

a socket arrangement is arranged within the further antenna arrangement, wherein the socket arrangement comprises a support surface; and the antenna arrangement is arranged on the support surface of the socket arrangement of the further antenna arrangement.

15. The stacked antenna system according to claim 14, characterized by the following features:

the base plate of the antenna arrangement is formed by the support surface of the socket arrangement; or the base plate of the antenna arrangement is arranged on top of the support surface of the socket arrangement and is galvanically or capacitively connected to the support surface of the socket arrangement.

16. A mobile radio antenna comprising:

a plurality of antenna arrangements, each antenna arrangement of the plurality of antenna arrangements comprising:

an antenna comprising an antenna body and a radiator arrangement, the radiator arrangement being arranged at an upper side of the antenna body; and an antenna holder and a base plate that is electrically conductive, wherein the antenna holder comprises a base portion, wherein an upper side of the base portion points towards an underside of the antenna body and wherein an underside of the base portion points towards the base plate;

wherein:

only a supporting part of the underside of the antenna body rests on the base portion, so that a receiving space is formed between another part of the underside of the antenna body and the base portion; and at least the base portion of the antenna holder is electrically non-conductive, whereby the another part of the underside of the antenna body is capacitively coupled to the base plate via the receiving space;

a plurality of stacked antenna systems, each stacked antenna system of the plurality of antenna systems comprising:

an antenna arrangement of the plurality of antenna arrangements, the antenna arrangement configured to operate in a first frequency range; and a further antenna arrangement of the plurality of antenna arrangements, the further antenna arrangement configured to operate in a second frequency range which lies below the first frequency range;

wherein:

a reflector is provided;

the further antenna arrangement is arranged on the reflector and comprises a radiator structure with at least four radiator elements extending away from the reflector in a funnel-shaped manner;

a socket arrangement is arranged within the further antenna arrangement, wherein the socket arrangement comprises a support surface; and the antenna arrangement is arranged on the support surface of the socket arrangement of the further antenna arrangement wherein the mobile radio antenna is further characterized by the following features:

the plurality of antenna arrangements and the plurality of stacked antenna systems are arranged alternately along a longitudinal axis of the mobile radio antenna on a first side of the reflector;

at least one phase shifting device is provided and arranged on a second side of the reflector; and a radome arrangement is provided wherein the radome arrangement closes the mobile radio antenna.

* * * * *